US012627792B2

(12) United States Patent
Li et al.

(10) Patent No.: US 12,627,792 B2
(45) Date of Patent: May 12, 2026

(54) SCREEN CONTENT PROCESSING METHOD AND APPARATUS, AND DEVICE

(71) Applicant: Beijing Bytedance Network Technology Co., Ltd., Beijing (CN)

(72) Inventors: Lingyu Li, Beijing (CN); Yue Wang, Beijing (CN); Li Zhang, Los Angeles, CA (US)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 339 days.

(21) Appl. No.: 18/262,533

(22) PCT Filed: Jan. 26, 2022

(86) PCT No.: PCT/CN2022/074131
§ 371 (c)(1),
(2) Date: Jul. 21, 2023

(87) PCT Pub. No.: WO2022/166727
PCT Pub. Date: Aug. 11, 2022

(65) Prior Publication Data
US 2024/0089428 A1 Mar. 14, 2024

(30) Foreign Application Priority Data

Feb. 5, 2021 (CN) .......................... 202110164130.9

(51) Int. Cl.
*H04N 19/109* (2014.01)
*H04N 19/119* (2014.01)
(Continued)

(52) U.S. Cl.
CPC ......... *H04N 19/109* (2014.11); *H04N 19/119* (2014.11); *H04N 19/137* (2014.11); *H04N 19/172* (2014.11); *H04N 19/503* (2014.11)

(58) Field of Classification Search
CPC .. H04N 19/109; H04N 19/119; H04N 19/137; H04N 19/172; H04N 19/503
See application file for complete search history.

(56) References Cited

U.S. PATENT DOCUMENTS

| | | | | |
|---|---|---|---|---|
| 10,255,683 | B1 * | 4/2019 | Gopal | ................... G06V 20/52 |
| 2004/0001544 | A1 | 1/2004 | Mehrotra | |

(Continued)

FOREIGN PATENT DOCUMENTS

| | | |
|---|---|---|
| CN | 103281538 A | 9/2013 |
| CN | 103404145 A | 11/2013 |

(Continued)

OTHER PUBLICATIONS

China National Intellectual Property Administration, Notice of Allowance Issued in Application No. 202110164130.9, Sep. 27, 2022, 6 pages.

(Continued)

*Primary Examiner* — Jeremiah C Hallenbeck-Huber
(74) *Attorney, Agent, or Firm* — Alleman Hall LLP

(57) ABSTRACT

A screen content processing method includes: dividing screen content into a plurality of areas; detecting pixel similarity between a first target area of a current frame of the screen content and a second target area of a previous frame of the screen content; using a pixel hash table of the second target area as a pixel hash table of the first target area if the similarity satisfies a first detection result; calculating pixel hash values of the first target area to establish a pixel hash table if the similarity satisfies a second detection result; traversing, according to a pixel hash table of an area to be coded in the first target area of the current frame, pixel hash tables of reference areas and performing intra block copy (Continued)

processing or hash motion estimation processing, to complete screen content processing for the first target area of the current frame.

15 Claims, 4 Drawing Sheets

(51) Int. Cl.
    *H04N 19/137*     (2014.01)
    *H04N 19/172*     (2014.01)
    *H04N 19/503*     (2014.01)

(56) References Cited

U.S. PATENT DOCUMENTS

| | | | | |
|---|---|---|---|---|
| 2015/0023405 | A1* | 1/2015 | Joshi | H04N 19/117 |
| | | | | 375/240.02 |
| 2015/0208084 | A1* | 7/2015 | Zhu | H04N 19/52 |
| | | | | 375/240.16 |
| 2015/0288953 | A1* | 10/2015 | Kakegawa | G06T 7/97 |
| | | | | 348/43 |
| 2015/0373359 | A1* | 12/2015 | He | H04N 19/147 |
| | | | | 375/240.12 |
| 2017/0201769 | A1* | 7/2017 | Chon | H04N 19/147 |
| 2020/0099926 | A1* | 3/2020 | Tanner | H04N 19/97 |
| 2020/0267409 | A1* | 8/2020 | Stepin | H04N 19/137 |

FOREIGN PATENT DOCUMENTS

| | | |
|---|---|---|
| CN | 105578181 A | 5/2016 |
| CN | 108495139 A | 9/2018 |
| CN | 109743570 A | 5/2019 |
| CN | 110287149 A | 9/2019 |
| CN | 110446040 A | 11/2019 |
| CN | 111669595 A | 9/2020 |
| CN | 111836046 A | 10/2020 |
| CN | 112804528 A | 5/2021 |
| JP | 2008519480 A | 6/2008 |
| JP | 2017513343 A | 5/2017 |
| JP | 2017535148 A | 11/2017 |
| WO | 2015142829 A1 | 9/2015 |
| WO | 2019191891 A1 | 10/2019 |

OTHER PUBLICATIONS

China National Intellectual Property Administration, Office Action and Search Report Issued in Application No. 202110164130.9, Jun. 13, 2022, 10 pages.

China National Intellectual Property Administration, International Search Report and Written Opinion Issued in Application No. PCT/CN2022/074131, Apr. 15, 2022, WIPO, 14 pages.

Japan Patent Office, Decision to Grant a Patent for Japanese Application No. 2023-544245 , mailed Nov. 26, 2024, 5 Pages.

Zhu, W. et al., "Hash-Based Block Matching for Screen Content Coding," IEEE Transactions on Multimedia, vol. 17, No. 7, Jul. 2015, 10 pages.

European Patent Office, Extended European Search Report Issued in Application No. 22749006.7, Jun. 3, 2024, Germany, 14 pages.

Xu, X. et al., "Intra Block Copy for Next Generation Video Coding," Proceedings of "IEEE International Conference on Multimedia & Expo Workshops", Jul. 23, 2018, San Diego, CA, 4 pages.

Japan Patent Office, Office Action Issued in Application No. 2023544245, Jul. 30, 2024, 22 pages.

\* cited by examiner

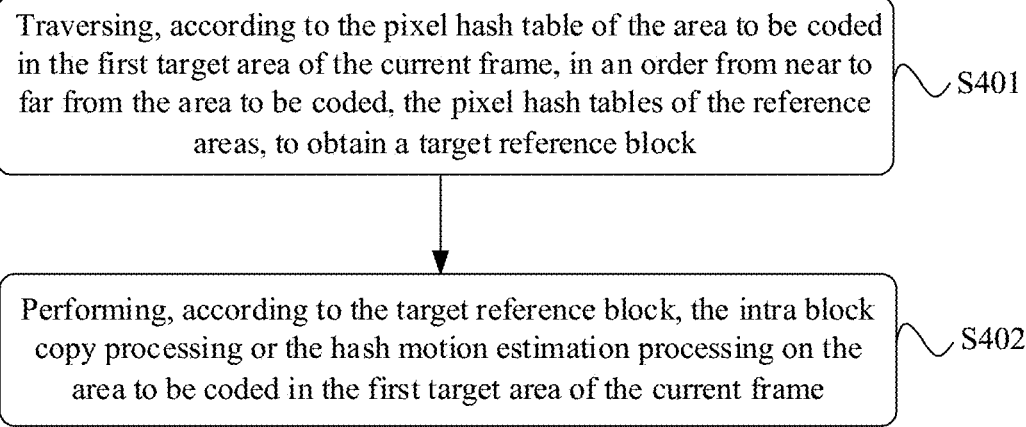

Traversing, according to the pixel hash table of the area to be coded in the first target area of the current frame, in an order from near to far from the area to be coded, the pixel hash tables of the reference areas, to obtain a target reference block ⟋ S401

Performing, according to the target reference block, the intra block copy processing or the hash motion estimation processing on the area to be coded in the first target area of the current frame ⟋ S402

FIG. 4

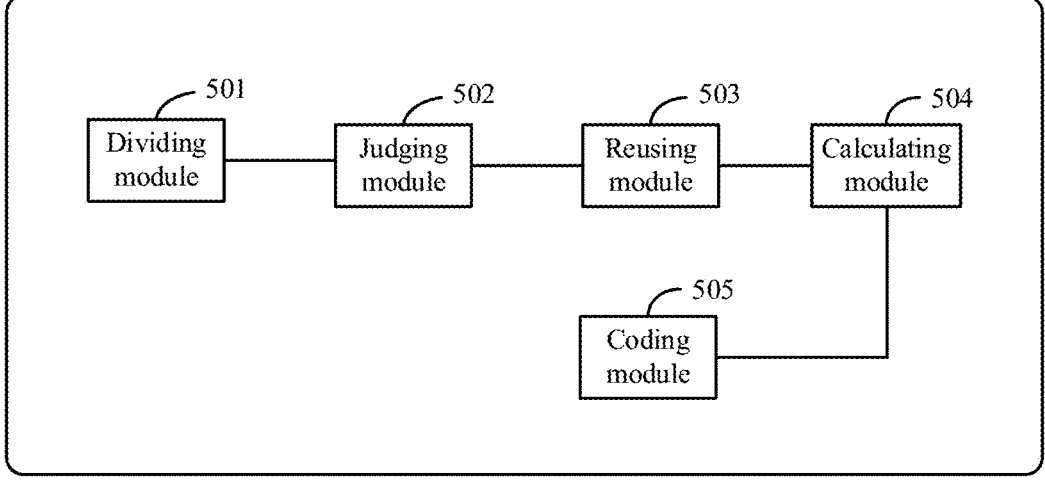

| 501 | 502 | 503 | 504 |
| Dividing module | Judging module | Reusing module | Calculating module |

505
Coding module

FIG. 5

SCREEN CONTENT PROCESSING METHOD AND APPARATUS, AND DEVICE

CROSS-REFERENCE TO RELATED APPLICATIONS

This application is a National Stage of International Application No. PCT/CN2022/074131, filed on Jan. 26, 2022, which claims priority to Chinese patent application No. 202110164130.9, entitled "SCREEN CONTENT PROCESSING METHOD AND APPARATUS, AND DEVICE" and filed with the China National Intellectual Property Administration on Feb. 5, 2021. Both of the above applications are incorporated herein by reference in their entireties.

TECHNICAL FIELD

Embodiments of the present disclosure relate to the field of communication and computer technologies, and in particular, to a screen content processing method and apparatus, and a device.

BACKGROUND

H.265 is also called high efficiency video coding (HEVC for short), which are hereinafter collectively referred to as H.265. In the screen content coding (SCC for short) technology of H.265, two coding tools, intra block copy (IBC for short) and hash motion estimation (Hash ME for short), have been added in view of characteristics such as zero noise of screen content and repetition of graphics and texts.

There are many identical text symbols in different frames of the screen content, and the screen content is noiseless, so hash values of identical text symbol content in different frames are exactly the same. At present, in existing processes of coding screen content by IBC and Hash ME, a hash value corresponding to each pixel position in a frame of the screen content is always required to form a hash table (correspondence relationship between a pixel position and a hash value). The principle of screen content coding by IBC is to divide a current frame of the screen content into multiple coding units of which each includes multiple pixel blocks, find a best matching reference block according to a hash table of the current frame, and predict pixel values of a current block according to pixels of the reference block. The principle of screen content coding by Hash ME is to divide a current frame of the screen content into multiple coding units which each include multiple pixel blocks, find, from a hash table of a reference frame and according to a hash value of a current block, a best matching reference block, and predict pixel values of the current block according to pixels of the reference block.

However, the inventors find that the existing modes of screen content coding by IBC or Hash ME are all implemented by searching for pixels of an entire frame of the screen content based on hash values, so the hash value needs to be calculated for each pixel of each frame of the screen content, causing a very large amount of calculation, and thus affecting the processing efficiency of screen content coding.

SUMMARY

Embodiments of the present disclosure provide a screen content processing method and apparatus, and a device, which can reduce redundant hash calculation, increase the coding speed of screen content coding, and improve the processing efficiency of screen content coding.

In a first aspect, an embodiment of the present disclosure provides a screen content processing method, including:

dividing screen content into a plurality of areas;

detecting pixel similarity between a first target area of a current frame of the screen content and a second target area of a previous frame of the screen content, where the first target area and the second target area are areas corresponding to each other in the screen content;

using a pixel hash table of the second target area of the previous frame as a pixel hash table of the first target area of the current frame, if the similarity satisfies a first detection result;

calculating pixel hash values of the first target area of the current frame to establish the pixel hash table of the first target area of the current frame, if the similarity satisfies a second detection result; and traversing, according to a pixel hash table of an area to be coded in the first target area of the current frame, pixel hash tables of reference areas and performing intra block copy processing or hash motion estimation processing on the area to be coded, to complete screen content processing of the first target area of the current frame.

In a second aspect, an embodiment of the present disclosure provides a screen content processing apparatus, including:

a dividing module, configured to divide screen content into a plurality of areas;

a judging module, configured to detect pixel similarity between a first target area of a current frame of the screen content and a second target area of a previous frame of the screen content, where the first target area and the second target area are areas corresponding to each other in the screen content;

a reusing module, configured to use a pixel hash table of the second target area of the previous frame as a pixel hash table of the first target area of the current frame, if the similarity satisfies a first detection result;

a calculating module, configured to calculate pixel hash values of the first target area of the current frame to establish the pixel hash table of the first target area of the current frame, if the similarity satisfies a second detection result; and a coding module, configured to, traverse, according to a pixel hash table of an area to be coded in the first target area of the current frame, pixel hash tables of reference areas and perform intra block copy processing or hash motion estimation processing on the area to be coded, to complete screen content processing of the first target area of the current frame.

In a third aspect, an embodiment of the present disclosure provides an electronic device, including: a processor and a memory;

the memory stores a computer-executed instruction; and the processor executes the computer-executed instruction stored in the memory, to cause the processor to execute the screen content processing method according to the above first aspect and various possible designs of the first aspect.

In a fourth aspect, an embodiment of the present disclosure provides a computer-readable storage medium, where a computer-executed instruction is stored in the computer-readable storage medium, and when the computer-executed instruction is executed by a processor, the screen content processing method according to the above first aspect and various possible designs of the first aspect is implemented.

In a fifth aspect, an embodiment of the present disclosure provides a computer program product, including a computer program, where when the computer program is executed by a processor, the screen content processing method according to the above first aspect and various possible designs of the first aspect is implemented.

In a sixth aspect, an embodiment of the present disclosure provides a computer program, where when the computer program is executed by a processor, the screen content processing method according to the above first aspect and various possible designs of the first aspect is implemented.

For the screen content processing method and apparatus, and the device provided in the embodiments, in the embodiments of the present disclosure, by dividing content of a current frame into several areas, performing recalculation to establish a hash table for an area having obvious changes in screen content of the current frame in comparison to a previous frame, and reusing a hash table of the previous frame for an area having similar screen content, redundant hash calculation is reduced, the coding speed of screen content coding is increased, and coding efficiency is thus improved.

BRIEF DESCRIPTION OF DRAWINGS

In order to illustrate the technical solutions in embodiments of the present disclosure or in the prior art more clearly, the drawings required for describing the embodiments or the prior art will be briefly introduced below. Obviously, the accompanying drawings described below show some embodiments of the present disclosure, and persons of ordinary skill in the art may still derive other drawings from these accompanying drawings without creative efforts.

FIG. 4 is schematic flowchart II of a screen content processing method provided by an embodiment of the present disclosure.

FIG. 5 is a structural block diagram of a screen content processing apparatus provided by an embodiment of the present disclosure.

DESCRIPTION OF EMBODIMENTS

To make the objectives, technical solutions and advantages of embodiments of the present disclosure clearer, the following clearly and comprehensively describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments in the present disclosure without creative efforts shall fall within the protection scope of the present disclosure.

Figure 1:
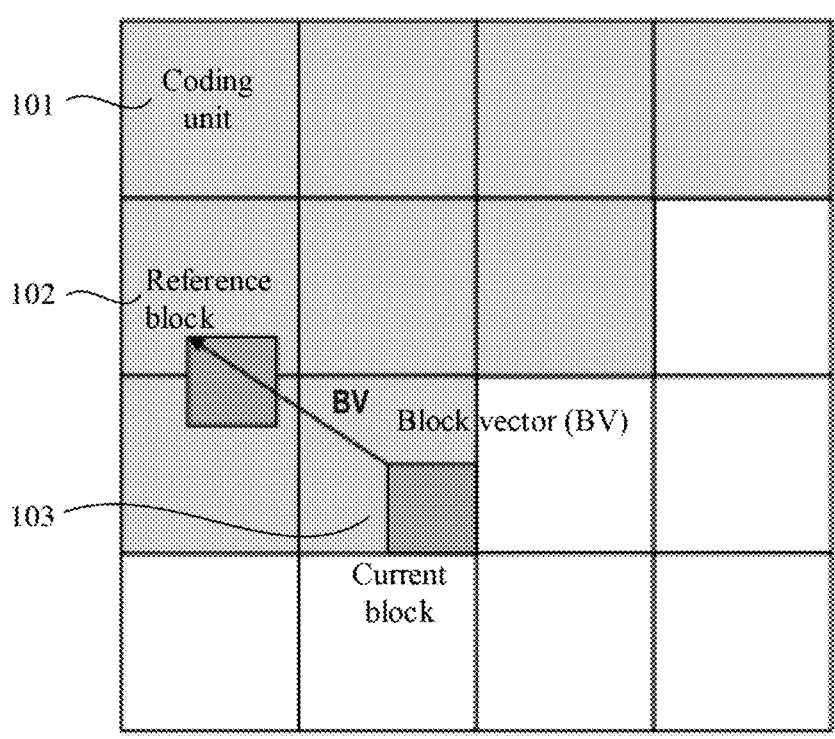
FIG. 1 is a schematic diagram of a principle of IBC coding.

There are many identical text symbols in different frames of the screen content, and the screen content is noiseless, so hash values of identical text symbol content in different frames are exactly the same. At present, in existing processes of coding screen content by IBC and Hash ME, a hash value corresponding to each pixel position in a frame of the screen content is always required to form a hash table (correspondence relationship between a pixel position and a hash value). Please refer to FIG. 1, FIG. 1 is a schematic diagram of a principle of IBC coding. In FIG. 1, a current frame of screen content is divided into multiple coding units 101 and each coding unit includes multiple pixel blocks. A best matching reference block 102 (one of the pixel blocks) is found according to a reconstructed pixel area (a gray part in FIG. 1) in a hash table of the current frame. Pixel values of a current block 103 are predicted according to pixels of the reference block. Here, to predict the pixel values of the current block 103 from the pixels of the reference block, it is necessary to calculate a block vector (BV for short) from the current block 103 to the reference block 102, where BV represents integer pixel accuracy. The principle of screen content coding by Hash ME is to divide a current frame of the screen content into multiple coding units which each include multiple pixel blocks, find, from a hash table of a reference frame and according to a hash value of a current block, a best matching reference block, and predict pixel values of the current block according to pixels of the reference block.

At present, the existing modes of screen content coding by IBC or Hash ME are all implemented by searching for pixels of an entire frame of the screen content based on hash values, so calculation of the hash value needs to be performed for each pixel of each frame of the screen content, causing a very large amount of calculation, and thus affecting the processing efficiency of screen content coding.

In order to solve the above-mentioned technical problems, an embodiment of the present disclosure provides a screen content processing method, in which the screen content is divided into a plurality of areas, and pixel similarity between a current frame and a previous frame in a same area is compared. If a result of the comparison is that pixels of the current frame and the previous frame in the same area are similar (that is, pixel difference is small), a pixel hash table of the previous frame in this area is directly used as a pixel hash table of the current frame in this area. If the result of the comparison is that the pixels of the current frame and the previous frame in the same area are not similar (that is, the pixel difference is large), it is necessary to calculate the pixel hash table of the current frame in this area. For this area of the current frame, according to a pixel hash table of an area to be coded in this area, pixel hash tables of reference areas are traversed and intra block copy processing or hash motion estimation processing is performed on the area to be coded in this area, to complete processing of the target area of the current frame. Screen content of a frame is divided into several areas, a hash table is re-established for an area having obvious changes in screen content in comparison to a previous frame, and a hash table of the previous frame is reused for an area having similar screen content, thereby reducing redundant hash calculation, increasing a processing speed of screen content coding and improving the efficiency of coding screen content.

Figure 2:
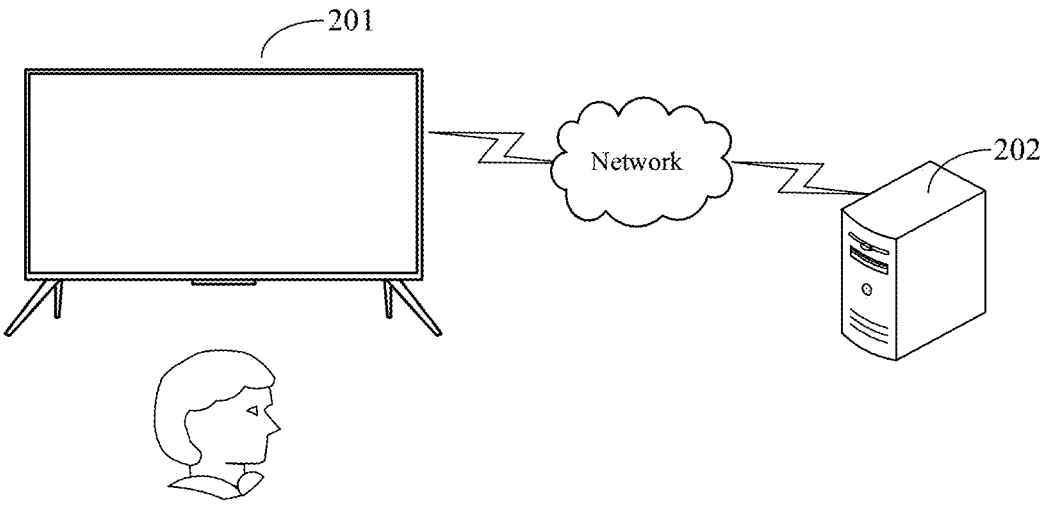
FIG. 2 is a schematic diagram of a system architecture of a screen content processing method provided by an embodiment of the present disclosure.

Please refer to FIG. 2. FIG. 2 is a schematic diagram of a system architecture of a screen content processing method provided by an embodiment of the present disclosure. As shown in FIG. 2, a system provided by the embodiment includes a display terminal 201 and a server end 202. The display terminal 201 can be installed on devices such as a mobile phone, a tablet computer, and a personal computer, etc. In this embodiment, the implementation of the display terminal 201 is not particularly limited, as long as the display terminal 201 can perform input and output interactions with a user. The display terminal has a display interface for displaying screen content of the screen. The server end 202 may be one server end or a cluster composed of several server ends.

The display terminal may be a wireless terminal or a wired terminal. A wireless terminal may refer to a device that provides voice and/or other service data connectivity to a user, a handheld device with a wireless connection function, or other processing devices connected to a wireless modem. The wireless terminal can communicate with one or more core network devices via a radio access network (RAN for short), and the wireless terminal may be a mobile terminal, such as a mobile phone (or called a "cellular" phone), and a computer equipped with a mobile terminal, and for example, the wireless terminal may be portable, pocket, handheld, built-in-computer or vehicle-mounted mobile devices, which exchange language and/or data with the radio access network. For another example, the wireless terminal may also be a personal communication service (PCS for short) phone, a cordless phone, a session initiation protocol (SIP for short) phone, a wireless local loop (WLL for short) station, a personal digital assistant (PDA for short) and other devices. The wireless terminal can also be called a system, a subscriber unit, a subscriber station, a mobile station, a mobile, a remote station, a remote terminal, an access terminal, a user terminal, a user agent, a user device or a user equipment, which are not limited here. In an implementation, the above-mentioned display terminal may also be a device such as a smart watch, a tablet computer, or a personal computer, etc.

In an implementation, the screen content processing method provided by the embodiments of the present disclosure may be applied in a video conference scenario. Specifically, a coder is provided in the above-mentioned terminal or server end, and the coder may be an H265 coder. The coder of the terminal or the server end codes conference video content through the screen content processing method provided by the embodiments of the present disclosure. By dividing the conference video content of a current frame into several areas, re-establishing a hash table for an area having obvious changes in the conference video content in comparison to a previous frame, and reusing a hash table of the previous frame for an area having similar screen content, redundant hash calculation is reduced, the coding speed of screen content coding is increased, and efficiency of coding the conference video content is thus improved.

It should be noted that: the screen content involved in the embodiments of the present disclosure, in addition to the above conference video, may also be display content of desktop remote collaboration, a cloud game, a second screen, desktop sharing, and online education, etc.

Figure 3:
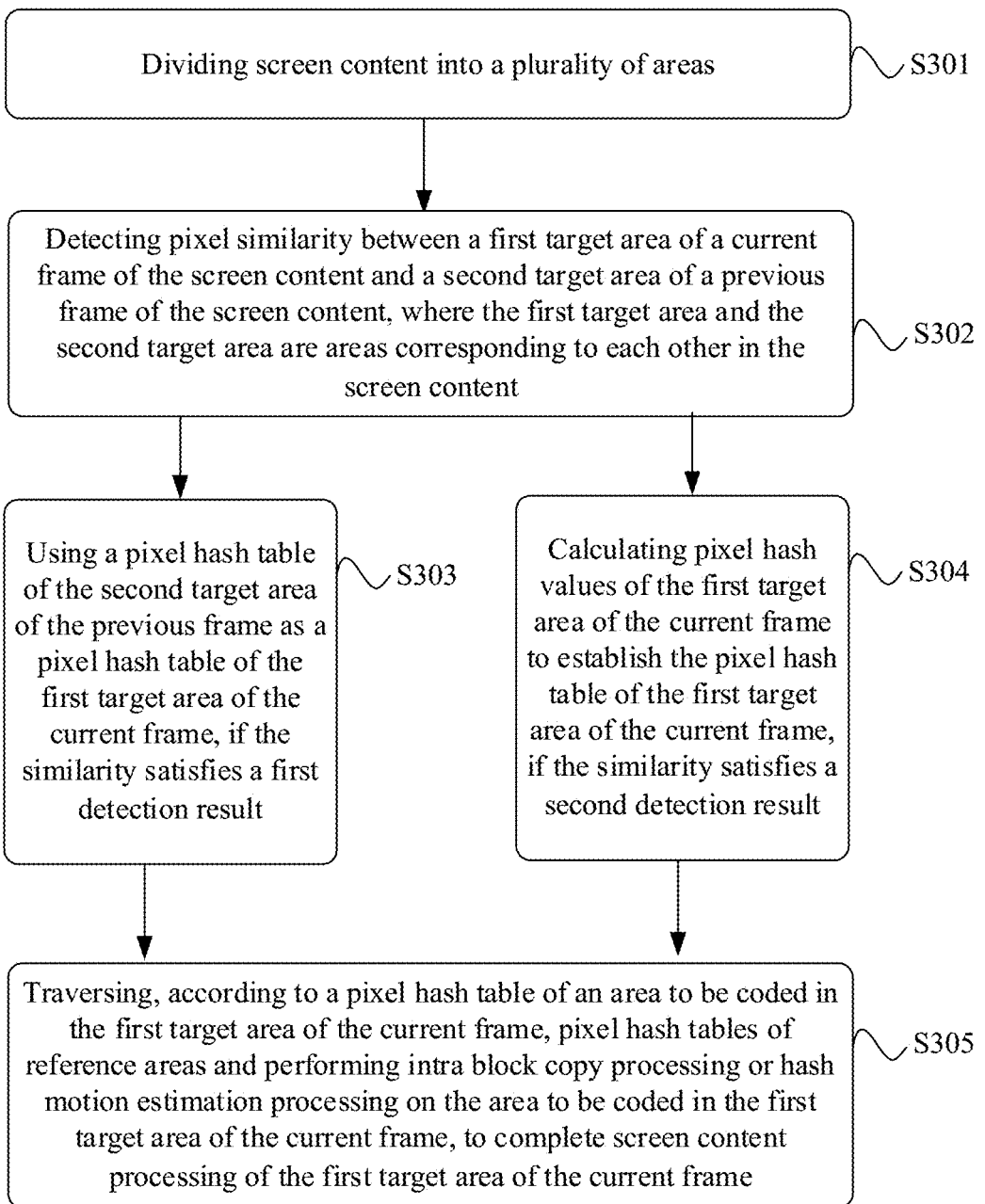
FIG. 3 is schematic flowchart I of a screen content processing method provided by an embodiment of the present disclosure.

Please refer to FIG. 3. FIG. 3 is schematic flowchart I of a screen content processing method provided by an embodiment of the present disclosure. The method of this embodiment can be applied to the display terminal or the server end shown in FIG. 2, and the present disclosure does not make any limitations thereto. The screen content processing method includes:

S301: dividing screen content into a plurality of areas.

In an embodiment of the present disclosure, the screen content may be screen video content or screen image content. The screen content has characteristics of zero noise and many repeated graphics and texts.

In an embodiment of the present disclosure, the plurality of areas may be a plurality of rectangular areas, and the plurality of rectangular areas may be obtained by equidistant and regular division or irregular division.

S302: detecting pixel similarity between a first target area of a current frame of the screen content and a second target area of a previous frame of the screen content, where the first target area and the second target area are areas corresponding to each other in the screen content.

The first target area may be any one of the plurality of areas; the previous frame may be a frame that the current frame follows. The first target area and the second target area being areas corresponding to each other in the screen content means that the first target area and the second target area are areas at a same position in the screen content of the current frame and of the previous frame.

In an embodiment of the present disclosure, the pixel similarity between the first target area of the current frame of the screen content and the second target area of the previous frame of the screen content is determined according to pixel values of the first target area of the current frame of the screen content and pixel values of the second target area of the previous frame of the screen content.

Specifically, the pixel values of the first target area of the current frame and the pixel values of the second target area of the previous frame are obtained.

According to the pixel values of the first target area of the current frame and the pixel values of the second target area of the previous frame, similarity between pixels of the first target area of the current frame and pixels of the second target area of the previous frame is calculated according to a preset algorithm.

In an embodiment of the present disclosure, calculation objects of the preset algorithm are the pixel value of each pixel position of the first target area of the current frame and the pixel value of each pixel position of the second target area of the previous frame.

The preset algorithm includes at least one of the following: sum of absolute difference (SAD for short), sum of absolute transformed difference (SATD for short), and sum of squared error (SSE for short).

S303: using a pixel hash table of the second target area of the previous frame as a pixel hash table of the first target area of the current frame, if the similarity satisfies a first detection result.

Specifically, the similarity satisfying the first detection result means that the similarity is greater than a defined similarity threshold.

In an embodiment of the present disclosure, the similarity threshold may be selected and defined according to different types of the screen content. For example, types of the screen content include but not limited to text content and picture content.

Specifically, using the pixel hash table of the second target area of the previous frame as the pixel hash table of the first target area of the current frame may be to copy content of a pointer to the pixel hash table of the second target area of the previous frame.

S304: calculating pixel hash values of the first target area of the current frame to establish the pixel hash table of the first target area of the current frame, if the similarity satisfies a second detection result.

Specifically, the similarity satisfying the second detection result means that the similarity is less than or equal to the defined similarity threshold.

In an embodiment of the present disclosure, a hash value corresponding to each pixel position of the first target area of the current frame is calculated; and the pixel hash table is established with the hash value of each pixel position in the first target area of the current frame as a value of "key" and each pixel position as a value of "value".

Specifically, calculating the pixel hash value of each pixel position of the first target area of the current frame to establish the pixel hash table includes: calculating a hash value of an 8×8 pixel block at an upper left corner of each pixel position of the first target area of the current frame, and establishing the pixel hash table with this hash value as the value of "key" and this pixel position as the value of "value", where pixel nodes with a same hash value forms a hash linked list.

S305: traversing, according to a pixel hash table of an area to be coded in the first target area of the current frame, pixel hash tables of reference areas and performing intra block copy processing or hash motion estimation processing on the area to be coded in the first target area of the current frame, to complete screen content processing of the first target area of the current frame.

In an embodiment of the present disclosure, the reference area may be a reference area of the current frame or of a reference frame, where the reference frame may be any frame prior to the current frame. The area to be coded may be any sub-area to be coded in the first target area, or the entire target area.

Performing the intra block copy processing or the hash motion estimation processing on the area to be coded in the first target area of the current frame may be applied to a coding end or a decoding end. Specifically, intra block copy coding or hash motion estimation coding may be performed on the area to be coded in the first target area of the current frame, or, intra block copy decoding or hash motion estimation decoding may be performed on the area to be coded in the first target area of the current frame.

Traversing, according to the pixel hash table of the area to be coded in the first target area of the current frame, the pixel hash tables of the reference areas and performing the intra block copy coding on the area to be coded, includes: traversing, according to the pixel hash table of the area to be coded, the pixel hash tables of the reference areas to find a pixel node having a same value of "key" (hash value), where all pixel nodes having a same value of "key" form a hash linked list, and screen content at a pixel position of each pixel node in the linked list is exactly the same as screen content of the area to be coded; and selecting, according to a rate-distortion cost, pixels of a reference block having a lowest rate-distortion cost from the linked list, as reference pixels of the area to be coded, and performing motion compensation according to the reference pixels of the reference block, to obtain pixels of the area to be coded, i.e., to obtain the screen content of the area to be coded, to complete the coding of the first target area of the current frame.

It can be understood that a principle of the hash motion estimation coding is similar to that of the intra block copy coding. A difference therebetween is that the intra block copy coding is to find a best matching reference block according to a hash table of the current frame, and predict pixel values of the current block according to pixels of this reference block, while Hash ME screen content coding is to find, according to a hash value of the current block, a best matching reference block from a hash table of a reference frame (which may be any frame prior to the current frame), and predict, according to pixels of this reference block, pixel values of the current block.

As can be seen from the above description, in the embodiments, by dividing content of the current frame into several areas, performing recalculation to establish a hash table for an area having obvious changes in the content in comparison to a previous frame, and reusing a hash table of the previous frame for an area having unchanged content, redundant hash calculation is reduced, the coding speed of screen content coding is increased, and coding efficiency is thus improved.

Please refer to FIG. 4. FIG. 4 is schematic flowchart II of a screen content processing method provided by an embodiment of the present disclosure. In this embodiment, a specific process of traversing, according to the pixel hash table of the area to be coded in the first target area of the current frame, the pixel hash tables of the reference areas and performing the intra block copy processing or the hash motion estimation processing on an area to be coded, to complete the screen content processing of the first target area of the current frame in the above step S305 is mainly described in detail, which includes:

S401: traversing, according to the pixel hash table of the area to be coded in the first target area of the current frame, in an order from near to far from the area to be coded, the pixel hash tables of the reference areas, to obtain a target reference block.

Taking the area to be coded as a center, the reference areas are traversed according to a range from near to far from the center, to search for a reference block, having a same hash value (in the pixel hash table) as the area to be coded, as the target reference block.

For example, first a search is made at a reference area adjacent to the center, then a query is made at a reference area that is one area (or one reference block) away from the center, and then a query is made at a reference area that is two areas (or two reference blocks) away from the center, and so on.

S402: performing, according to the target reference block, the intra block copy processing or the hash motion estimation processing on the area to be coded in the first target area of the current frame.

In an embodiment of the present disclosure, if the target reference block exists, pixel coding is performed on the area to be coded by using pixels of the target reference block as reference pixels. If no target reference block exists, normal pixel coding is then performed thereon.

In the prior art, usually, a hash table of the current frame of the screen content is established in a z-scan order for a coding tree unit (CTU for short). A reference block that is far away from a sub-area to be coded is preferentially referred to in a coding process, a long motion vector (a motion vector between the sub-area to be coded and the reference block) needs to be calculated, and a large number of bits is occupied and the coding quality is low. In this embodiment, the reference areas are traversed in the order from near to far from the area to be coded, ensuring that a reference block closer to the area to be coded is used as the target reference block, saving the number of bits occupied by a motion vector (MV for short), and improving the coding quality.

As can be seen from the above descriptions, in the embodiments of the present disclosure, by traversing the reference areas in the order from near to far from the area to be coded, the reference block closer to the area to be coded can be ensured to be used as the target reference block, the number of bits occupied by calculation of the motion vector can be saved and the coding quality is improved. Data proves that according to the embodiments of the present disclosure, traversing the reference areas in the order from near to far and then performing the intra block copy coding or the hash motion estimation coding can improve video coding quality with a Bjøntegaard delta bit rate (BDBR for short) of –3%. The BDBR indicates a bit rate percentage that can be saved by a better coding method under same objective quality, and the lower the BDBR, the better the compression performance of a current coder.

In an embodiment of the present disclosure, after the traversing, according to the pixel hash table of the area to be coded in the first target area of the current frame, the pixel hash tables of the reference areas and performing the intra block copy processing or the hash motion estimation processing on the area to be coded, to complete the screen content processing of the first target area of the current frame, the method further includes:

judging whether or not the first target area is a last area of the plurality of areas of the divided screen content; if yes, completing processing on the current frame of the screen content; if not, continuing to perform the step of detecting pixel similarity between a next area of the first target area of the current frame of the screen content and a same area corresponding to the next area of the previous frame.

In an embodiment of the present disclosure, the screen content is divided into a plurality of areas, and an identification can be set for each area according to a coding sequence, and the coding sequence of the respective areas can be determined according to the identification. Similarly, according to the identification of each area, whether or not the area is the last area of the plurality of areas can be determined.

It can be seen from the above descriptions that in the embodiments, according to the plurality of divided areas, each area can be sequentially coded or decoded, so as to implement the processing of the entire screen content.

In an embodiment of the present disclosure, in step S301, the dividing the screen content into the plurality of areas includes:

dividing the screen content into N (in length)×N (in height) rectangular areas, where N is a positive integer. In the embodiment of the present disclosure, a value of N may be determined according to a size of the screen content. A length and a height in terms of a size of each area are: a ratio of a length of the screen content to N, and a ratio of a height of the screen content to N, respectively.

In an implementation, the value of N may be 2-8.

With the value of N ranging from 2 to 8, a typical test sequence with a group of pictures (GOP for short) structure is used for testing, and compared with an existing coding method, test results are shown in the following table:

| Value of N | Coding time (%) | Bjøntegaard delta bit rate (BDBR) |
| --- | --- | --- |
| 2 | –2.94 | –0.75 |
| 3 | –6.5 | –0.34 |
| 4 | –7.36 | –0.28 |
| 5 | –8.5 | –0.08 |
| 6 | –7.54 | –0.08 |
| 7 | –7.01 | –0.16 |
| 8 | –6 | –222 |

The data proves that when N is 4, using the test sequence of an IPPP GOP structure, the coding time can be reduced by 7.36%, and meanwhile the coding quality is improved with a BDBR of –0.28%, rendering a best overall effect.

It can be seen from the above descriptions that by dividing into rectangular areas of equal shape and size, the coding time can be shortened and the coding compression efficiency can be improved.

In an embodiment of the present disclosure, before step S301, the method further includes: determining the similarity threshold according to a size of the first target area.

In an embodiment of the present disclosure, the similarity threshold may be defined to be positively correlated with the size of the first target area. The larger the size of the first target area, the larger the similarity threshold, and the smaller the size of the first target area, the lower the similarity threshold. That is, the larger the first target area is, the larger the allowable similarity threshold error range is.

It can be seen from the above descriptions that by determining the similarity threshold according to the size of the first target area, whether or not the content of the first target area of the current frame of the screen content is similar to the content of the second target area of the previous frame can be accurately determined, thereby the accuracy of detection is improved.

Corresponding to the screen content processing method in the foregoing embodiments, FIG. 5 is a structural block diagram of a screen content processing apparatus provided by an embodiment of the present disclosure. For ease of description, only the parts related to the embodiments of the present disclosure are shown. Referring to FIG. 5, the apparatus includes: a dividing module 501, a judging module 502, a reusing module 503, a calculating module 504 and a coding module 505.

The dividing module 501 is configured to divide screen content into a plurality of areas;

the judging module 502 is configured to detect pixel similarity between a first target area of a current frame of the screen content and a second target area of a previous frame of the screen content, where the first target area and the second target area are areas corresponding to each other in the screen content;

the reusing module 503 is configured to use a pixel hash table of the second target area of the previous frame as a pixel hash table of the first target area of the current frame, if the similarity satisfies a first detection result;

the calculating module 504 is configured to calculate pixel hash values of the first target area of the current frame to establish the pixel hash table of the first target area of the current frame, if the similarity satisfies a second detection result; and the coding module 505 is configured to, traverse, according to a pixel hash table of an area to be coded in the first target area of the current frame, pixel hash tables of reference areas and perform intra block copy processing or hash motion estimation processing on the area to be coded, to complete screen content processing of the first target area of the current frame.

According to one or more embodiments of the present disclosure, the judging module 502 specifically obtains pixel values of the first target area of the current frame and pixel values of the second target area of the previous frame; and calculates, according to a preset algorithm, similarity between pixels of the first target area of the current frame and pixels of the second target area of the previous frame, according to the pixel values of the first target area of the current frame and the pixel values of the second target area of the previous frame.

According to one or more embodiments of the present disclosure, the preset algorithm includes at least one of the following: sum of absolute difference, sum of absolute transformed difference, and sum of squared error.

According to one or more embodiments of the present disclosure, the coding module 505, specifically, traverses, according to the pixel hash table of the area to be coded in the first target area of the current frame, in an order from near to far from the area to be coded, the pixel hash tables of the reference areas, to obtain a target reference block; and performs, according to the target reference block, the intra block copy processing or the hash motion estimation processing on the area to be coded in the first target area of the current frame.

According to one or more embodiments of the present disclosure, the judging module 502 is further configured to judge whether or not the first target area is a last area of the plurality of areas of the divided screen content; if yes, complete processing on the current frame of the screen content; if not, continue to perform the step of detecting pixel similarity between a next area of the first target area of the current frame of the screen content and a same area corresponding to the next area of the previous frame.

According to one or more embodiments of the present disclosure, the calculating module 504 is specifically configured to calculate a hash value corresponding to each pixel position in the first target area of the current frame; and establish the pixel hash table with the hash value of each pixel position in the first target area of the current frame as a value of "key" and each pixel position as a value of "value".

According to one or more embodiments of the present disclosure, the dividing module 501 is specifically configured to divide the screen content into N×N rectangular areas, where N is a positive integer.

According to one or more embodiments of the present disclosure, the apparatus further includes: a threshold determining module 506, configured to determine a similarity threshold according to a size of the first target area.

The apparatus provided in the embodiments can be used to implement the technical solutions of the above method embodiments, and their implementation principles and technical effects are similar, and are not repeated in the embodiments here.

In order to implement the foregoing embodiments, an embodiment of the present disclosure further provides an electronic device.

Figure 6:
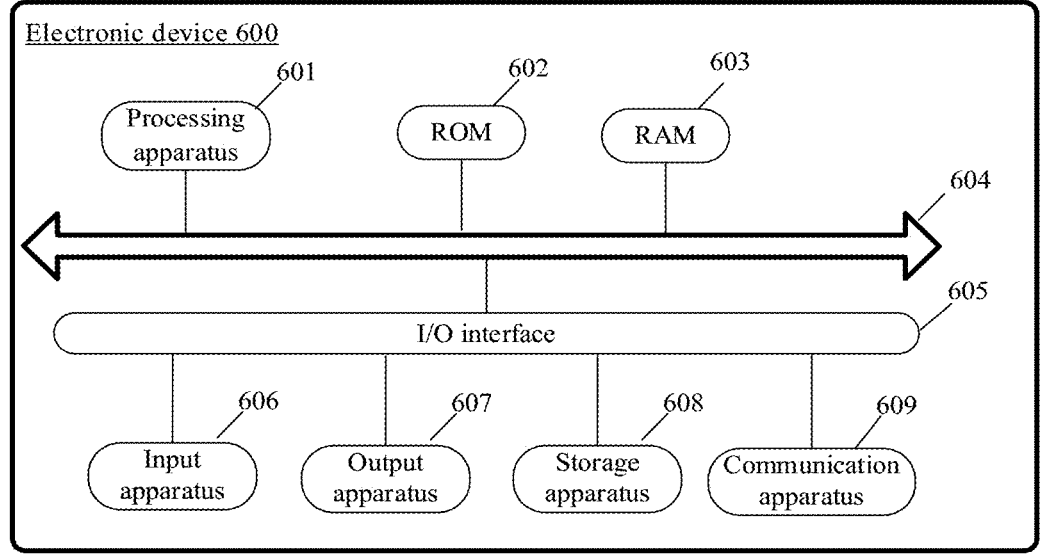
FIG. 6 is a schematic diagram of a hardware structure of an electronic device provided by an embodiment of the present disclosure.

Please refer to FIG. 6 which shows a schematic structural diagram of an electronic device 600 for implementing the embodiments of the present disclosure. The electronic device 600 may be a display terminal device or a server. The display terminal device may include but not limited to mobile display terminals such as a mobile phone, a notebook computer, a digital broadcast receiver, a personal digital assistant (PDA for short), a portable android device (PAD for short), a portable media player (PMP for short), and a vehicle-mounted display terminal (such as a vehicle-mounted navigation display terminal), etc. and fixed display terminals such as a digital TV and a desktop computer, etc. The electronic device shown in FIG. 6 is only an example, and should not limit the functions and application scope of the embodiments of the present disclosure.

As shown in FIG. 6, an electronic device 600 may include a processing apparatus (e.g., a central processing unit, a graphics processing unit, etc.) 601 which may perform various appropriate actions and processing according to a program stored in a read only memory (ROM for short) 602 or a program loaded from a storage apparatus 608 into a random access memory (RAM for short) 603. Various programs and data necessary for the operation of the electronic device 600 are further stored in the RAM 603. The processing apparatus 601, ROM 602, and RAM 603 are connected to each other through a bus 604. And an input/output (I/O for short) interface 605 is also connected to the bus 604.

Generally, the following apparatuses may be connected to the I/O interface 605: an input apparatus 606 including, for example, a touch screen, a touchpad, a keyboard, a mouse, a camera, a microphone, an accelerometer, a gyroscope, etc.; an output apparatus 607 including, for example, a liquid crystal display (LCD for short), a speaker, a vibrator, etc.; a storage apparatus 608 including, for example, a magnetic tape, a hard disk, etc.; and a communication apparatus 609. The communication means 609 may allow the electronic device 600 to perform wireless or wired communication with other devices to exchange data. Although FIG. 6 shows the electronic device 600 having various apparatuses, it should be understood that not all of the illustrated apparatuses are required to be implemented or provided. More or fewer apparatuses may alternatively be implemented or provided.

In particular, according to an embodiment of the present disclosure, the processes described above with reference to the flowcharts may be implemented as a computer software program. For example, an embodiment of the present disclosure includes a computer program product, which includes a computer program carried on a computer-readable medium, where the computer program includes program codes for executing the methods shown in the flowcharts. In such an embodiment, the computer program may be downloaded from a network and installed via the communication apparatus 609, or installed from the storage apparatus 608, or installed from the ROM 602. When the computer program is executed by the processing apparatus 601, the above-mentioned functions defined in the methods of the embodiments of the present disclosure are performed.

It should be noted that the above-mentioned computer-readable medium in the present disclosure may be a computer-readable signal medium or a computer-readable storage medium or any combination thereof. The computer-readable storage medium may be, for example, but not limited to, an electrical, a magnetic, an optical, an electro-magnetic, an infrared, or a semiconductor system, apparatus, or device, or any combination thereof. More specific examples of computer-readable storage media may include, but are not limited to, an electrical connection with one or more wires, a portable computer disk, a hard disk, a random access memory (RAM), a read-only memory (ROM), an erasable programmable read-only memory (EPROM for short, or a flash memory), an optical fiber, a portable compact disk read-only memory (CD-ROM for short), an optical storage device, a magnetic storage device, or any suitable combination thereof. In the present disclosure, the computer-readable storage medium may be any tangible medium that contains or stores a program that can be used by or in conjunction with an instruction execution system, apparatus, or device. In the present disclosure, the computer-readable signal medium may include a data signal propagated in a baseband or as part of a carrier wave carrying computer-readable program codes therein. Such a propagated data signal may take a variety of forms, including but not limited to an electromagnetic signal, an optical signal, or any suitable combination thereof. The computer-readable signal medium may also be any computer-readable medium other than the computer-readable storage medium, and the computer-readable signal medium can transmit, propagate, or transport the program used by or in conjunction with the instruction execution system, apparatus, or device. The program codes contained on the computer-readable medium may be transmitted through any appropriate medium, including but not limited to: an electric wire, an optical fiber cable, a radio frequency (RF for short), etc., or any suitable combination thereof.

The above-mentioned computer-readable medium may be included in the above-mentioned electronic device, or may exist independently without being incorporated into the electronic device.

The above-mentioned computer-readable medium carries one or more programs, and when the above-mentioned one or more programs are executed by the electronic device, the electronic device is caused to implement the methods shown in the above-mentioned embodiments.

The computer program codes for carrying out the operations of the present disclosure may be written in one or more programming languages, or a combination thereof, where the above programming languages include an object-oriented programming language, such as Java, Smalltalk, and C++, as well as a conventional procedural programming language, such as "C" language or similar programming languages. The program codes may be executed entirely on a user computer, executed partly on a user computer, executed as a stand-alone software package, executed partly on a user computer and partly on a remote computer, or executed entirely on a remote computer or a server. In a case involving the remote computer, the remote computer may be connected to the user computer through any kind of network, including a local area network (LAN for short) or a wide area network (WAN for short), or may be connected to an external computer (e.g., connected via the Internet using an Internet service provider).

The flowcharts and block diagrams in the figures illustrate the architecture, functionality, and operation of possible implementations of the systems, methods and computer program products according to various embodiments of the present disclosure. In this regard, each block in a flowchart or block diagram may represent a module, a program segment, or a portion of codes that includes one or more executable instructions for implementing a specified logical function. It should also be noted that, in some alternative implementations, functions indicated in the blocks may occur in an order different from that indicated in the figures. For example, two blocks shown in succession may, in fact, be executed substantially concurrently, or the blocks may sometimes be executed in the reverse order, depending upon the functionality involved. It should also be noted that each block of the block diagrams and/or flowcharts, or a combination of blocks in the block diagrams and/or flowcharts may be implemented in a special purpose hardware-based system that perform a specified function or operation, or may be implemented in a combination of special purpose hardware and a computer instruction The units involved in the embodiments described in the present disclosure may be implemented by software or by hardware. Names of these units do not constitute a limitation on the units per se under certain circumstances. For example, a first obtaining unit may also be described as "a unit for obtaining at least two Internet protocol addresses".

The functions described herein above may be performed at least in part by one or more hardware logic components. For example, without limitation, exemplary types of hardware logic components that may be used include: a field programmable gate array (FPGA for short), an application specific integrated circuit (ASIC for short), an application specific standard product (ASSP for short), a system on chip (SOC for short), a complex programmable logic device (CPLD for short), etc.

In the context of the present disclosure, a machine-readable medium may be a tangible medium that may contain or store a program for use by or in conjunction with an instruction execution system, apparatus, or device. The machine-readable medium may be a machine-readable signal medium or a machine-readable storage medium. The machine-readable medium may include, but is not limited to, an electronic, a magnetic, an optical, an electromagnetic, an infrared, or a semiconductor systems, apparatus, or devices, or any suitable combination thereof. More specific examples of the machine-readable storage medium would include an electrical connection based on one or more wires, a portable computer disk, a hard disk, a random access memory (RAM), a read only memory (ROM), an erasable programmable read only memory (EPROM or a flash memory), fiber optics, a portable compact disk read only memory (CD-ROM), an optical storage device, a magnetic storage device, or any suitable combination of the foregoing.

In a first aspect, according to one or more embodiments of the present disclosure, a screen content processing method is provided, including:

dividing screen content into a plurality of areas;

detecting pixel similarity between a first target area of a current frame of the screen content and a second target area of a previous frame of the screen content, where the first target area and the second target area are areas corresponding to each other in the screen content;

using a pixel hash table of the second target area of the previous frame as a pixel hash table of the first target area of the current frame, if the similarity satisfies a first detection result;

calculating pixel hash values of the first target area of the current frame to establish the pixel hash table of the first target area of the current frame, if the similarity satisfies a second detection result; and traversing, according to a pixel hash table of an area to be coded in the first target area of the current frame, pixel hash tables of reference areas and performing intra block copy processing or hash motion estimation processing on the area to be coded.

According to one or more embodiments of the present disclosure, the detecting the pixel similarity between the first target area of the current frame of the screen content and the second target area of the previous frame of the screen content includes:

obtaining pixel values of the first target area of the current frame and pixel values of the second target area of the previous frame; and calculating, according to a preset algorithm, similarity between pixels of the first target area of the current frame and pixels of the second target area of the previous frame, according to the pixel values of the first target area of the current frame and the pixel values of the second target area of the previous frame.

According to one or more embodiments of the present disclosure, the preset algorithm includes at least one of the following: sum of absolute difference, sum of absolute transformed difference, and sum of squared error.

According to one or more embodiments of the present disclosure, the traversing, according to the pixel hash table of the area to be coded in the first target area of the current frame, the pixel hash tables of the reference areas and performing the intra block copy processing or the hash motion estimation processing on the area to be coded includes:

traversing, according to the pixel hash table of the area to be coded in the first target area of the current frame, in an order from near to far from the area to be coded, the pixel hash tables of the reference areas, to obtain a target reference block; and performing, according to the target reference block, the intra block copy processing or the hash motion estimation processing on the area to be coded in the first target area of the current frame.

According to one or more embodiments of the present disclosure, after the traversing, according to the pixel hash table of the area to be coded in the first target area of the current frame, the pixel hash tables of the reference areas and performing the intra block copy processing or the hash motion estimation processing on the area to be coded, the method further includes:

judging whether or not the first target area is a last area of the plurality of areas of the divided screen content; if yes, completing processing on the current frame of the screen content; if not, continuing to perform the step of detecting pixel similarity between a next area of the first target area of the current frame of the screen content and a same area corresponding to the next area of the previous frame.

According to one or more embodiments of the present disclosure, the calculating the pixel hash values of the first target area of the current frame to establish the pixel hash table of the first target area of the current frame includes: calculating a hash value corresponding to each pixel position in the first target area of the current frame; and establishing the pixel hash table with the hash value of each pixel position in the first target area of the current frame as a value of "key" and each pixel position as a value of "value".

According to one or more embodiments of the present disclosure, the similarity satisfying the first detection result means that the similarity is greater than a defined similarity threshold; the similarity satisfying the second detection result means that the similarity is less than or equal to the defined similarity threshold.

According to one or more embodiments of the present disclosure, the dividing the screen content into the plurality of areas includes: dividing the screen content into N×N rectangular areas, where N is a positive integer.

According to one or more embodiments of the present disclosure, the method further includes: determining the similarity threshold according to a size of the first target area.

In a second aspect, according to one or more embodiments of the present disclosure, a screen content processing apparatus is provided, including:

a dividing module, configured to divide screen content into a plurality of areas;

a judging module, configured to detect pixel similarity between a first target area of a current frame of the screen content and a second target area of a previous frame of the screen content, where the first target area and the second target area are areas corresponding to each other in the screen content;

a reusing module, configured to use a pixel hash table of the second target area of the previous frame as a pixel hash table of the first target area of the current frame, if the similarity satisfies a first detection result;

a calculating module, configured to calculate pixel hash values of the first target area of the current frame to establish the pixel hash table of the first target area of the current frame, if the similarity satisfies a second detection result; and a coding module, configured to, traverse, according to a pixel hash table of an area to be coded in the first target area of the current frame, pixel hash tables of reference areas and perform intra block copy processing or hash motion estimation processing on the area to be coded.

According to one or more embodiments of the present disclosure, the judging module specifically obtains pixel values of the first target area of the current frame and pixel values of the second target area of the previous frame; and calculates, according to a preset algorithm, similarity between pixels of the first target area of the current frame and pixels of the second target area of the previous frame, according to the pixel values of the first target area of the current frame and the pixel values of the second target area of the previous frame.

According to one or more embodiments of the present disclosure, the preset algorithm includes at least one of the following: sum of absolute difference, sum of absolute transformed difference, and sum of squared error.

According to one or more embodiments of the present disclosure, the coding module, specifically, traverses according to the pixel hash table of the area to be coded in the first target area of the current frame, in an order from near to far from the area to be coded, the pixel hash tables of the reference areas, to obtain a target reference block; and performs, according to the target reference block, the intra block copy processing or the hash motion estimation processing on the area to be coded in the first target area of the current frame.

According to one or more embodiments of the present disclosure, the judging module is further configured to judge whether or not the first target area is a last area of the plurality of areas of the divided screen content; if yes, complete processing on the current frame of the screen content; if not, continue to perform the step of detecting pixel similarity between a next area of the first target area of the current frame of the screen content and a same area corresponding to the next area of the previous frame.

According to one or more embodiments of the present disclosure, the calculating module is specifically configured to calculate a hash value corresponding to each pixel position in the first target area of the current frame; and establish the pixel hash table with the hash value of each pixel position in the first target area of the current frame as a value of "key" and each pixel position as a value of "value".

According to one or more embodiments of the present disclosure, the dividing module is specifically configured to divide the screen content into N×N rectangular areas, where N is a positive integer.

According to one or more embodiments of the present disclosure, the apparatus further includes: a threshold determining module configured to determine a similarity threshold according to a size of the first target area.

In a third aspect, according to one or more embodiments of the present disclosure, an electronic device is provided, including: at least one processor and a memory;

the memory stores a computer-executed instruction; and the at least one processor executes the computer-executed instruction stored in the memory, to cause the at least one processor to execute the screen content processing method described in the above first aspect and various possible designs of the first aspect.

In a fourth aspect, according to one or more embodiments of the present disclosure, a computer-readable storage medium is provided, where a computer-executed instruction is stored in the computer-readable storage medium, and when the computer-executed instruction is executed by a processor, the screen content processing method described in the above first aspect and various possible designs of the first aspect is implemented.

In a fifth aspect, an embodiment of the present disclosure provides a computer program product, including a computer program, where when the computer program is executed by a processor, the screen content processing method described in the above first aspect and various possible designs of the first aspect is implemented.

In a sixth aspect, an embodiment of the present disclosure provides a computer program, where when the computer program is executed by a processor, the screen content processing method described in the first aspect and various possible designs of the first aspect is implemented.

The above descriptions are only preferred embodiments of the present disclosure and illustrations of an applied technical principle. Those skilled in the art should understand that the disclosure scope involved in this disclosure is not limited to a technical solution formed by a specific combination of the above-mentioned technical features, but should also cover other technical solutions formed by any combination of the above technical features or their equivalents without departing from the above disclosure concept, for example, technical solutions formed by a mutual replacement between the above features and the technical features with similar functions (but not limited to) disclosed in the present disclosure In addition, while operations are depicted in a particular order, this should not be understood as requiring that the operations are performed in the particular order shown or performed in sequential order. Under certain circumstances, multitasking and parallel processing may be advantageous. Likewise, while the above discussion contains several specific implementation details, these should not be construed as limitations on the scope of the disclosure. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are merely example forms of implementing the claims.

What is claimed is:

1. A screen content processing method, comprising:
dividing screen content into a plurality of areas;
detecting pixel similarity between a first target area of a current frame of the screen content and a second target area of a previous frame of the screen content, wherein the first target area and the second target area are areas corresponding to each other in the screen content;
using a pixel hash table of the second target area of the previous frame as a pixel hash table of the first target area of the current frame, if the similarity satisfies a first detection result;
calculating pixel hash values of the first target area of the current frame to establish the pixel hash table of the first target area of the current frame, if the similarity satisfies a second detection result; and
traversing, according to a pixel hash table of an area to be coded in the first target area of the current frame, pixel hash tables of reference areas and performing intra block copy processing or hash motion estimation processing on the area to be coded, to complete screen content processing of the first target area of the current frame;
wherein the traversing, according to the pixel hash table of the area to be coded in the first target area of the current frame, the pixel hash tables of the reference areas and performing the intra block copy processing or the hash motion estimation processing on the area to be coded comprises:
traversing, according to the pixel hash table of the area to be coded in the first target area of the current frame, in an order from near to far from the area to be coded, the pixel hash tables of the reference areas to obtain a target reference block; and
performing, according to the target reference block, the intra block copy processing or the hash motion estimation processing on the area to be coded in the first target area of the current frame.

2. The method according to claim 1, wherein the detecting the pixel similarity between the first target area of the current frame of the screen content and the second target area of the previous frame of the screen content comprises:
obtaining pixel values of the first target area of the current frame and pixel values of the second target area of the previous frame; and
calculating, according to a preset algorithm, similarity between pixels of the first target area of the current frame and pixels of the second target area of the previous frame, according to the pixel values of the first target area of the current frame and the pixel values of the second target area of the previous frame.

3. The method according to claim 2, wherein the preset algorithm comprises at least one of the following: sum of absolute difference, sum of absolute transformed difference, and sum of squared error.

4. The method according to claim 2, wherein after the traversing, according to the pixel hash table of the area to be coded in the first target area of the current frame, the pixel hash tables of the reference areas and performing the intra block copy processing or the hash motion estimation processing on the area to be coded, the method further comprises:
judging whether or not the first target area is a last area of the plurality of areas of the divided screen content; if yes, completing processing on the current frame of the screen content; if not, continuing to perform the step of detecting pixel similarity between a next area of the first target area of the current frame of the screen content and a same area corresponding to the next area of the previous frame.

5. The method according to claim 2, wherein the calculating the pixel hash values of the first target area of the current frame to establish the pixel hash table of the first target area of the current frame comprises:
calculating a hash value corresponding to each pixel position in the first target area of the current frame; and
establishing the pixel hash table with the hash value of each pixel position in the first target area of the current frame as a value of "key" and each pixel position as a value of "value".

6. The method according to claim 2, wherein the similarity satisfying the first detection result means that the similarity is greater than a defined similarity threshold; the similarity satisfying the second detection result means that the similarity is less than or equal to the defined similarity threshold.

7. The method according to claim 1, wherein after the traversing, according to the pixel hash table of the area to be coded in the first target area of the current frame, the pixel hash tables of the reference areas and performing the intra block copy processing or the hash motion estimation processing on the area to be coded, the method further comprises:

judging whether or not the first target area is a last area of the plurality of areas of the divided screen content; if yes, completing processing on the current frame of the screen content; if not, continuing to perform the step of detecting pixel similarity between a next area of the first target area of the current frame of the screen content and a same area corresponding to the next area of the previous frame.

8. The method according to claim 7, wherein the calculating the pixel hash values of the first target area of the current frame to establish the pixel hash table of the first target area of the current frame comprises:

calculating a hash value corresponding to each pixel position in the first target area of the current frame; and establishing the pixel hash table with the hash value of each pixel position in the first target area of the current frame as a value of "key" and each pixel position as a value of "value".

9. The method according to claim 7, wherein the similarity satisfying the first detection result means that the similarity is greater than a defined similarity threshold; the similarity satisfying the second detection result means that the similarity is less than or equal to the defined similarity threshold.

10. The method according to claim 1, wherein the calculating the pixel hash values of the first target area of the current frame to establish the pixel hash table of the first target area of the current frame comprises:

calculating a hash value corresponding to each pixel position in the first target area of the current frame; and establishing the pixel hash table with the hash value of each pixel position in the first target area of the current frame as a value of "key" and each pixel position as a value of "value".

11. The method according to claim 1, wherein the similarity satisfying the first detection result means that the similarity is greater than a defined similarity threshold; the similarity satisfying the second detection result means that the similarity is less than or equal to the defined similarity threshold.

12. The method according to claim 11, further comprising:

determining the similarity threshold according to a size of the first target area.

13. The method according to claim 1, wherein the dividing the screen content into the plurality of areas comprises:

dividing the screen content into N×N rectangular areas, wherein N is a positive integer.

14. An electronic device, comprising: a processor and a memory;

wherein the memory stores a computer-executed instruction; and the processor executes the computer-executed instruction stored in the memory, to cause the processor to divide screen content into a plurality of areas;

detect pixel similarity between a first target area of a current frame of the screen content and a second target area of a previous frame of the screen content, wherein the first target area and the second target area are areas corresponding to each other in the screen content;

use a pixel hash table of the second target area of the previous frame as a pixel hash table of the first target area of the current frame, if the similarity satisfies a first detection result;

calculate pixel hash values of the first target area of the current frame to establish the pixel hash table of the first target area of the current frame, if the similarity satisfies a second detection result; and traverse, according to a pixel hash table of an area to be coded in the first target area of the current frame, pixel hash tables of reference areas and perform intra block copy processing or hash motion estimation processing on the area to be coded, to complete screen content processing of the first target area of the current frame;

wherein the processor is further caused to:

traverse, according to the pixel hash table of the area to be coded in the first target area of the current frame, in an order from near to far from the area to be coded, the pixel hash tables of the reference areas to obtain a target reference block; and perform, according to the target reference block, the intra block copy processing or the hash motion estimation processing on the area to be coded in the first target area of the current frame.

15. A non-transitory computer-readable storage medium, wherein a computer-executed instruction is stored in the computer-readable storage medium, and when the computer-executed instruction is executed by a processor, following steps are implemented:

dividing screen content into a plurality of areas;

detecting pixel similarity between a first target area of a current frame of the screen content and a second target area of a previous frame of the screen content, wherein the first target area and the second target area are areas corresponding to each other in the screen content;

using a pixel hash table of the second target area of the previous frame as a pixel hash table of the first target area of the current frame, if the similarity satisfies a first detection result;

calculating pixel hash values of the first target area of the current frame to establish the pixel hash table of the first target area of the current frame, if the similarity satisfies a second detection result; and traversing, according to a pixel hash table of an area to be coded in the first target area of the current frame, pixel hash tables of reference areas and performing intra block copy processing or hash motion estimation processing on the area to be coded, to complete screen content processing of the first target area of the current frame;

wherein the traversing, according to the pixel hash table of the area to be coded in the first target area of the current frame, the pixel hash tables of the reference areas and performing the intra block copy processing or the hash motion estimation processing on the area to be coded comprises:

traversing, according to the pixel hash table of the area to be coded in the first target area of the current frame, in an order from near to far from the area to be coded, the pixel hash tables of the reference areas to obtain a target reference block; and performing, according to the target reference block, the intra block copy processing or the hash motion estimation processing on the area to be coded in the first target area of the current frame.

\* \* \* \* \*